US010365736B2

(12) United States Patent
Gattis et al.

(10) Patent No.: US 10,365,736 B2
(45) Date of Patent: Jul. 30, 2019

(54) MORPHING PAD, SYSTEM AND METHOD FOR IMPLEMENTING A MORPHING PAD

(71) Applicant: VISTEON GLOBAL TECHNOLOGIES, INC., Van Buren Township, MI (US)

(72) Inventors: Christopher W. Gattis, Livonia, MI (US); Douglas Allen Pfau, Canton, MI (US)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 14/854,848

(22) Filed: Sep. 15, 2015

(65) Prior Publication Data
US 2017/0075443 A1    Mar. 16, 2017

(51) Int. Cl.
| G06F 3/01 | (2006.01) |
| G06F 3/041 | (2006.01) |
| G06F 3/03 | (2006.01) |
| G06F 3/048 | (2013.01) |

(52) U.S. Cl.
CPC .............. G06F 3/041 (2013.01); G06F 3/016 (2013.01); G06F 3/0304 (2013.01); G06F 3/048 (2013.01); G06F 2203/04103 (2013.01)

(58) Field of Classification Search
None
See application file for complete search history.

(56) References Cited

U.S. PATENT DOCUMENTS

| 6,636,202 B2 | 10/2003 | Ishmael, Jr. et al. |
| 8,217,910 B2 | 7/2012 | Stallings et al. |
| 2010/0053078 A1* | 3/2010 | Kim .................. G06F 3/016 345/156 |
| 2011/0216013 A1* | 9/2011 | Siotis ................ G06F 3/016 345/173 |
| 2012/0293461 A1 | 11/2012 | Choi |
| 2013/0155027 A1* | 6/2013 | Holmgren ........... G06F 3/0421 345/175 |
| 2014/0184947 A1* | 7/2014 | Bolzmacher ........ G06F 3/016 349/12 |
| 2014/0253687 A1* | 9/2014 | Lee .................. G06F 3/0488 348/46 |
| 2014/0266939 A1 | 9/2014 | Beringer et al. |
| 2014/0320436 A1* | 10/2014 | Modarres ............ G06F 3/016 345/173 |
| 2015/0138168 A1* | 5/2015 | Nagano ............... G06F 3/0383 345/179 |
| 2016/0259418 A1* | 9/2016 | Hsin ................... G06F 3/017 |
| 2016/0259465 A1* | 9/2016 | Agarwal .............. G06F 3/0414 |

FOREIGN PATENT DOCUMENTS

| CN | 202641808 U | 1/2013 |
| JP | 2005216110 A | 8/2005 |
| JP | 2008071102 A | 3/2008 |
| JP | 2010102508 A | 5/2010 |
| JP | 2012518228 A | 8/2012 |
| JP | 2013228849 A | 11/2013 |
| WO | 2014176532 A1 | 10/2014 |

* cited by examiner

Primary Examiner — Joseph R Haley
(74) Attorney, Agent, or Firm — Quinn IP Law

(57) ABSTRACT

Systems for implementing a morphing pad are provided herein. The systems include various components to receive data, the data being translated to a morphing pad engager to engage a morphing pad. Also included is a description of a method of manufacturing a morphing pad. Additionally, a morphing pad is described in detail above.

14 Claims, 11 Drawing Sheets

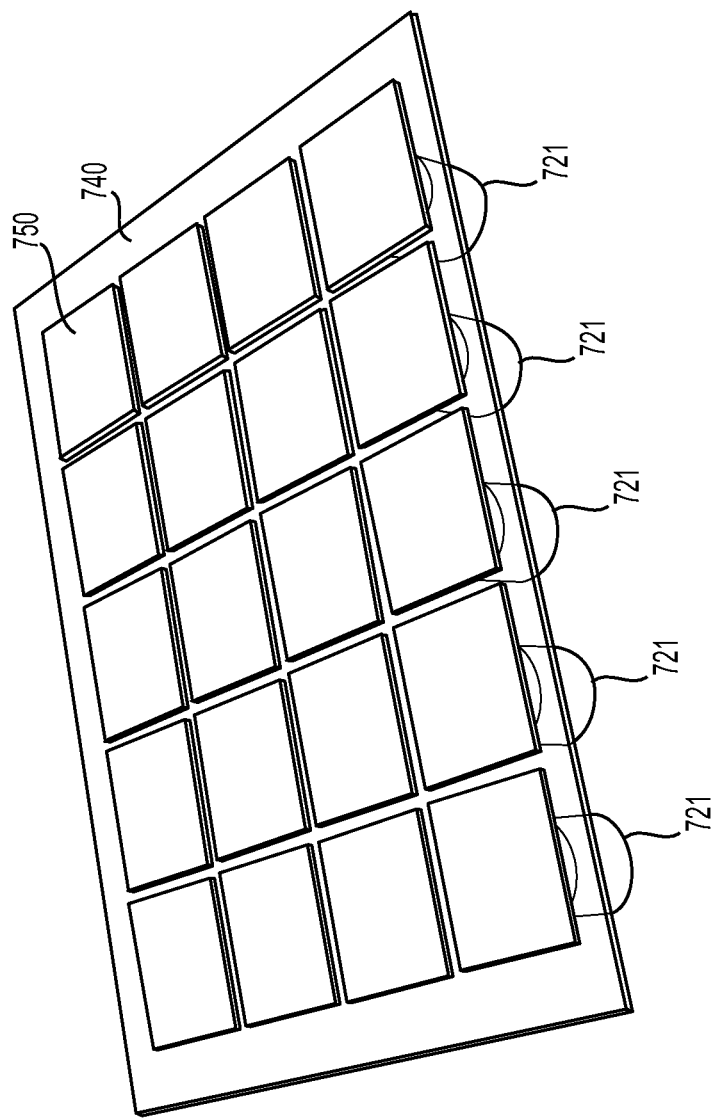

MORPHING PAD, SYSTEM AND METHOD FOR IMPLEMENTING A MORPHING PAD

BACKGROUND

Electronic systems have been provided in many contexts and environments. The electronic systems receive electrical or physical inputs, and perform processing based on the received inputs. The electronic systems may be implemented in many different environments, including a vehicle, a home, a computing system, and the like.

Users have engaged with electronic systems in many different ways. Initially, mechanical devices were provided, such as knobs, switches, and the like. The mechanical device were either replaced or augmented with electronic devices, such as keyboards, mice, and the like. These devices, whether mechanical or electrical, often times are viewed as bulky and hard to interface with.

In recent times, non-contact interfaces have become more common. These include voice recognition, gaze tracking, head tracking, or the like. A sensor is provided that captures a voice/sound, or an image/video, and translates the captured information into a stimulus. However, many users still prefer to use their hands or appendages to interact with an interface.

Another recent phenomenon is the advent of touch screen technologies. These are displays or surfaces provided with electronic capabilities to detect a touch. Some example implementations are capacitive touch and resistive touch. However, these implementations suffer from a common human machine interface deficiency, the lack of haptics. Because a user is engaging a flat surface, the user may not know whether interaction with a specific command has occurred.

The above problem may be remedied with the employment of haptics, i.e. responses that are pressure or sound based that indicate a specific touch. However, these solutions may still never replicate the feeling of engaging with a physical electronic or mechanical device.

SUMMARY

The following description relates to systems for implementing a morphing touch pad. Exemplary embodiments may also be directed to a method for manufacturing a morphing touch pad, as well as the morphing touch pad itself.

Additional features of the invention will be set forth in the description which follows, and in part will be apparent from the description, or may be learned by practice of the invention.

A system for implementing a morphing pad is included herein. An infrared (IR) detector configured to receive an indication of a user engagement with the morphing pad; and a morphing pad engager configured to engage a morphing pad based on the received indication A system for implementing a morphing pad is included herein. The system includes an application interfacer configured to interface with an electronic system, and receive application data associated with a presently executed application via the electronic system; a button interfacer configured to interface with the received application data and extract a location of a plurality of graphical user interface (GUI) elements associated with the application data; and a morphing pad engager configured to activate a subset of buttons on the morphing pad based on the location of the GUI elements.

A morphing pad device is included herein. The morphing pad includes an actuator installed on a mounting plate, the actuator configured to be moveable in a direction away from the mounting plate based on an electrical signal; and a morphing pad cover, the morphing pad cover being in-molded with the actuator, wherein the morphing pad device is electrically coupled to an electronic system.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
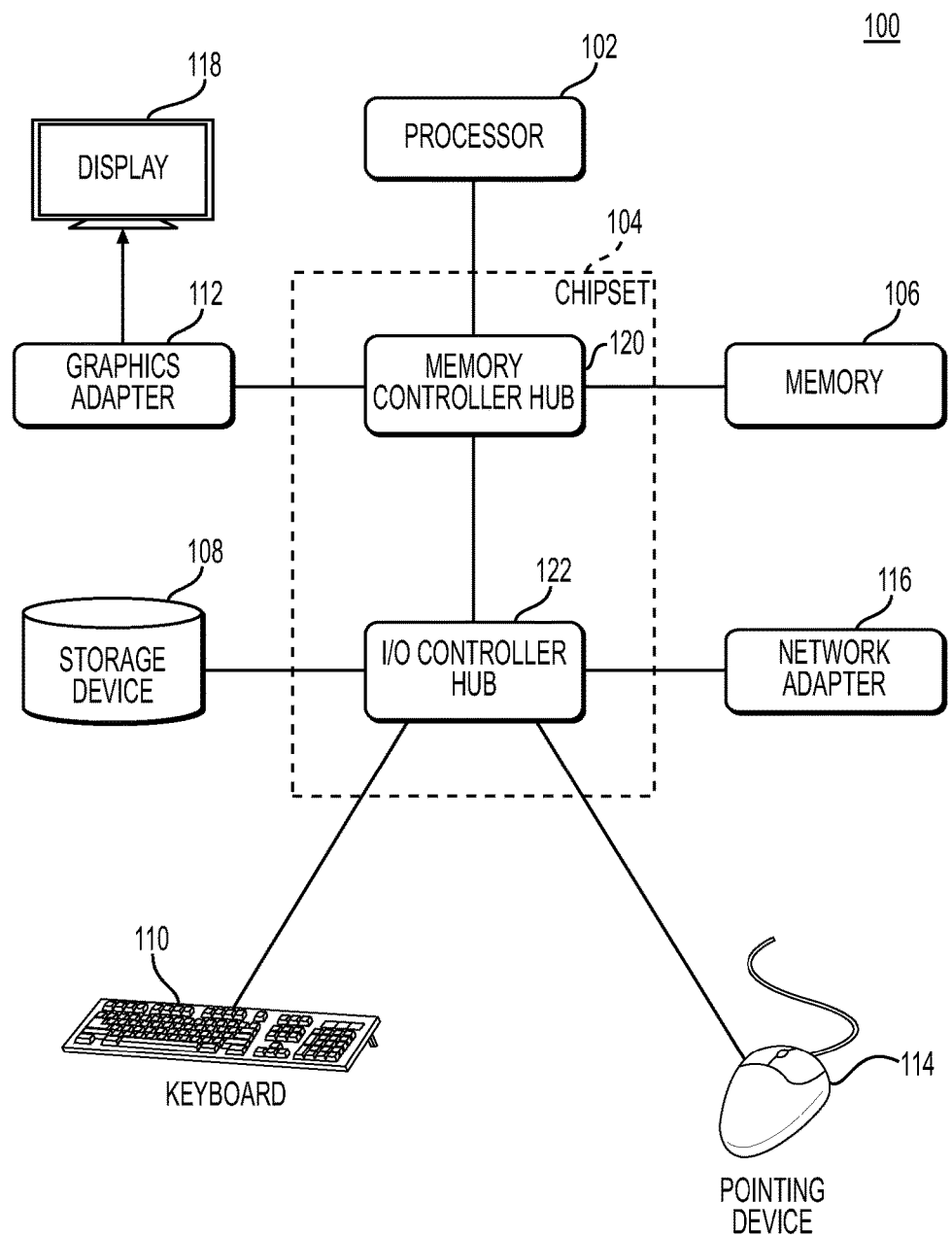
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Interfaces, such as those described in the Background, allow a user to interact and engage with an electronic system. The interfaces provide engage-able switches, knobs, touch surfaces, and the like, with the engagement being translated into an electrical signal that instigates the electronic system to perform a task.

Providing these interfaces in a customize-able and aesthetically pleasing manner is a difficult task. The interfaces may appear bulky, and thus, impede the overall look and feel of a device. In other situations, the interface may be suited for one task, but not for another.

For example, in a vehicular context, the interface may be ideal for controlling a radio or temperature setting, but engaging with an infotainment system may be frustrated. Thus, conventional interfaces may not be versatile and/or aesthetically pleasing.

The aspects disclosed herein are directed to providing various techniques associated with a morphing interface device ("morphing pad"). The aspects disclosed herein not only disclose a device for such a task, but also systems and methods for the implementation and installation of a morphing interface device.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
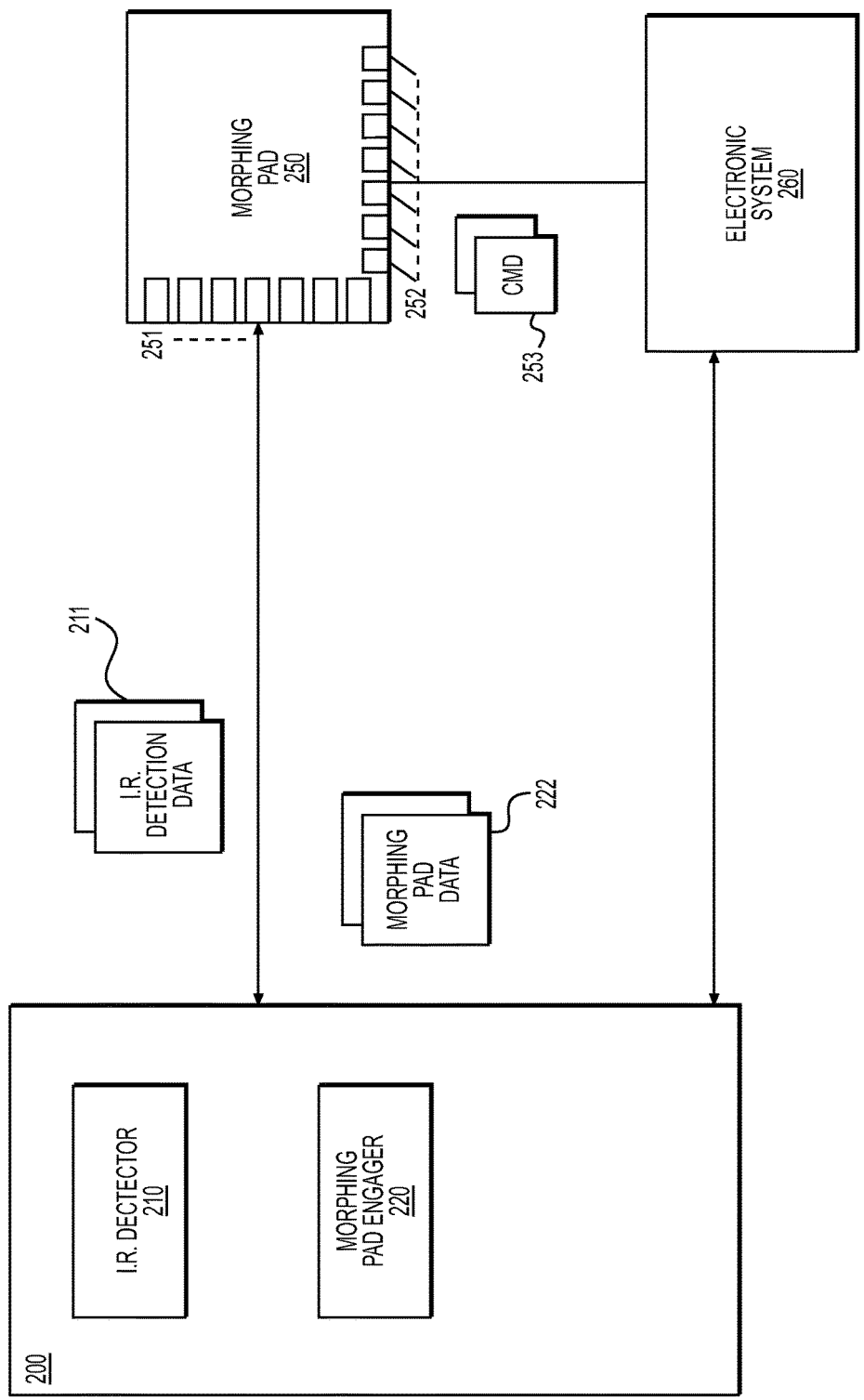
FIG. 2 illustrates an example of a system for implementing a morphing pad.

FIG. 2 illustrates an example of a system 200 for implementing a morphing pad 250. The morphing pad 250 (an example of which is shown in greater detail in FIGS. 7(a)-(g)), is a surface with engage-able buttons that change physical shape based on the operation or interaction. The morphing pad 250 may be substantially flat, and in response to a control signal from system 200, the morphing pad 250 may project various buttons (not shown in FIG. 2), based on the signals. The system 200 may be implemented on a computing device, such as computer 100 described above. The system 200 includes an infrared (IR) detector 210 and a morphing pad engager 220.

The system 200 shows an IR detector 210. However, in other examples of an implementation of system 200 according to the aspects disclosed herein, the detector used may encompass other detection techniques. For example, the following detector technologies may be implemented:

1) A break beam IR sensor, wherein the sensing is aligned around a touch pad surface;

2) A passive IR sensor, where the sensing is aided with a motion capturing technologies, such as a time-of-flight camera, a stereo camera, or a laser;

3) Time of flight cameras mounted in or above a touch pad area;

4) Force resistant film—the film may be embedded in the touch pad surface and based on a detection of an applied force, may engage the morphable buttons;

5) Resistive-type touch film—the film may be applied to the top (i.e. the surface engaged on) via the touch pad surface to detect voltage changes; and 6) Capacitive type touch films—film capable of using capacitive touch to detect engagement with the morphing touch pad.

The system 200 is coupled to a morphing pad 250 (via wired or wireless connections). The morphing pad 250 is used as an interface device that allows control and engagement of an electronic system 260. The electronic system 260 may be any sort of electrical device capable of receiving digital or analog inputs, and generating information accordingly. In response to the morphing pad 250 being engaged (i.e. the pressing of a button), the morphing pad 250 communicates a command 253 to the electronic system 260.

The morphing pad 250 includes an array of X (IR) transmitters 251, and an array of Y IR transmitters 252. In response to a detection of an object in the plane in which the IR sensors occupy (by employment of an IR reflection sensors), the specific point corresponding to the one of the X IR transmitters 251 and the Y IR transmitters 252 is registered.

The IR detector 210 detects a finger engaging a specific point of the morphing pad 250 (via IR detection data 211, propagated from the morphing pad 250). The IR detection data 211 indicates which coordinates are associated with the engagement of the morphing pad 250. The IR detection data 211 is generated when the X IR transmitters 251 and the Y IR transmitters 252 register a foreign object. The X IR transmitters 251 and the Y IR transmitters 252 may work with IR reflecting sensors to generate and propagate the IR detection data 211.

The morphing pad engager 220 is configured to communicate a morphing pad data signal 222 to the morphing pad 250. The morphing pad data signal 222 then may be employed by the morphing pad 250 to generate an asserted button on the morphing pad 250.

The morphing pad engager 220 may also receive information from the electronic system 260, and instigate a predetermined number of morphing pads based on an application being employed by the electronic system 260.

Figure 3A:
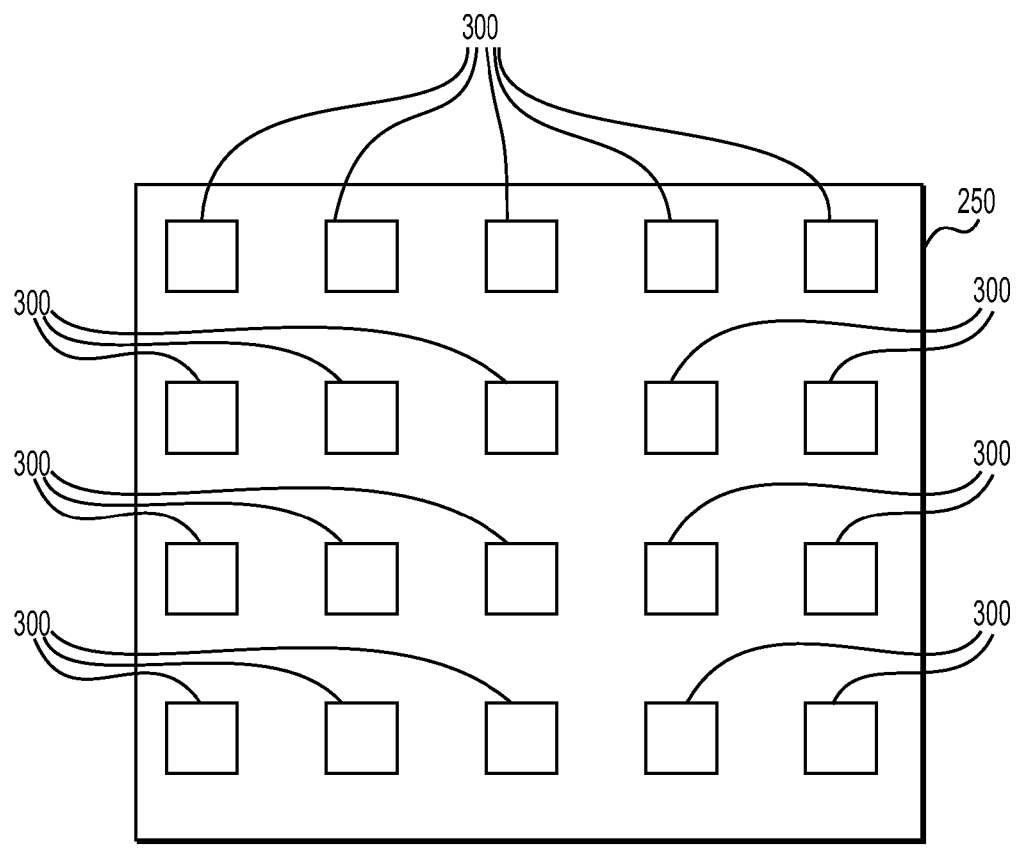
FIGS. 3(*a*) and (*b*) illustrate an example implementation of the system of FIG. 2.

FIGS. 3(a) and (b) illustrate an example implementation of the system 200. In FIG. 3(a), a morphing pad 250 is shown with 20 buttons 300. The buttons 300 are in a relatively flat state. As explained above, the buttons are equipped with the ability to move towards and away from the user (independent of assertion). Thus, some of the buttons are deployed in an outward position depending on the application and control of said morphing pad 250.

Figure 3B:
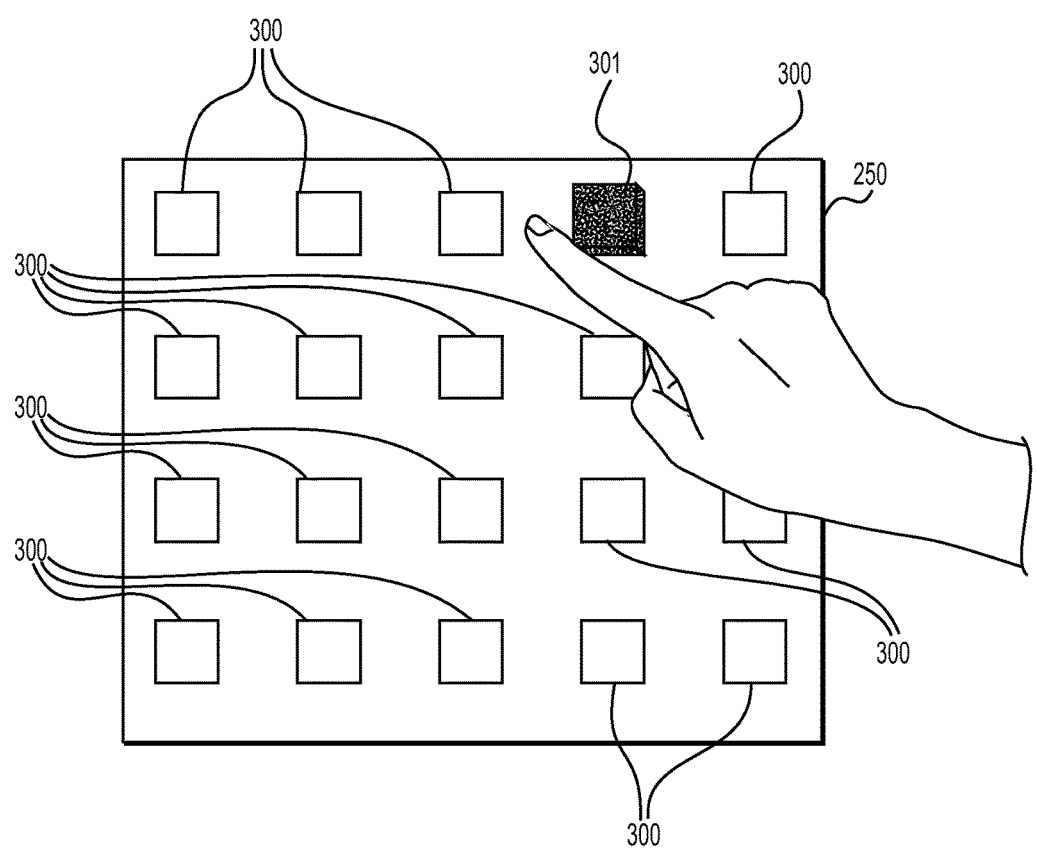

In FIG. 3(b), a user's hand 310 approaches button 301. Employing the aspects disclosed above, an IR detection data 211 is produced. The IR detection data 211 notes that the user's hand 310 is over a button 301 (which was button 300, but now asserted to be projected towards the user associated with hand 310). The button 301 may be engaged to generate a command 253 associated with an electronic system 260.

Figure 4:
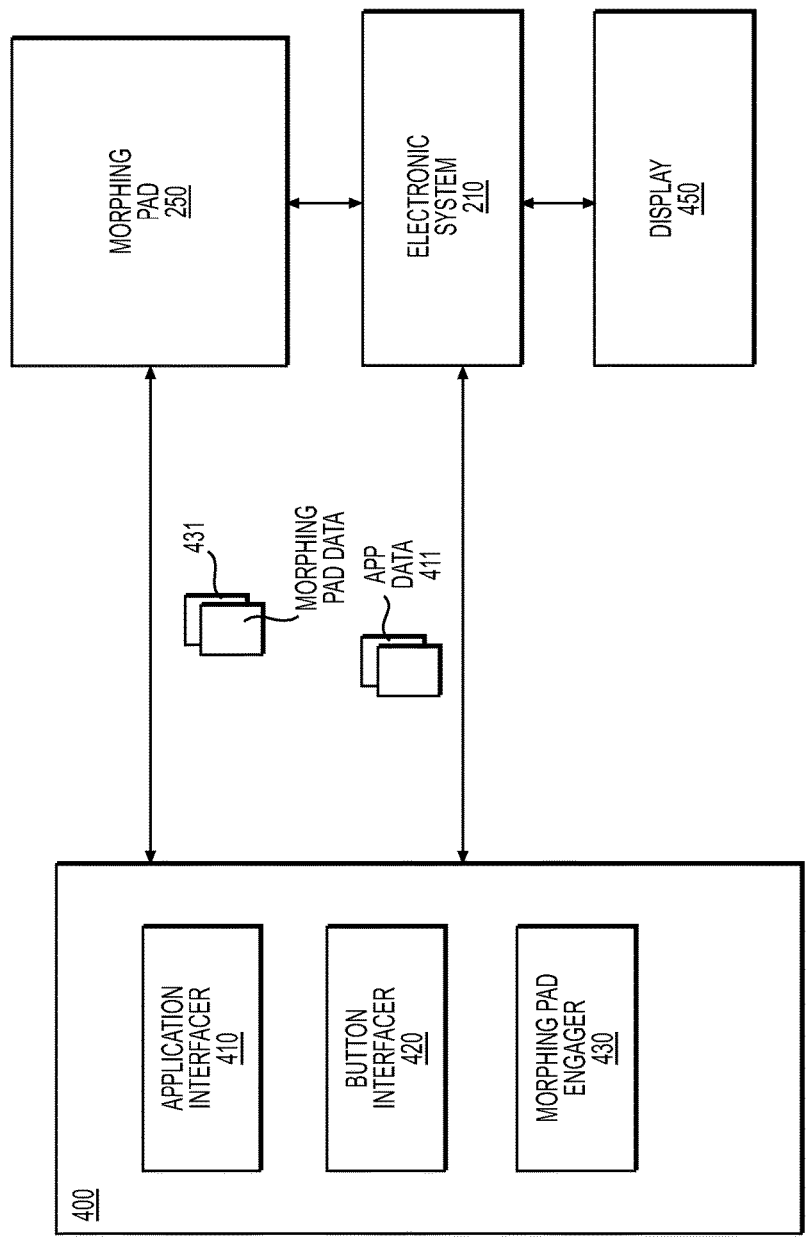
FIG. 4 illustrates an example of a system for implementing a morphing pad.

FIG. 4 illustrates an example of a system 400 for implementing a morphing pad 250. The system 400 may be implemented on a computing device, such as computer 100 described above. The system 400 includes an application interfacer 410, button interfacer 420, and a morphing pad engager 430.

Similar to FIG. 2, a morphing pad 250 and an electronic system 260 is shown. These elements are similar as those described above. One difference is that the morphing pad 250 shown in FIG. 4 does not include any IR sensors. The IR sensors may electively be implemented with system 400. However, for the purposes of explanation, the IR sensors are not shown.

Also shown is a display 450. The display 450 may be any known digital device provided to couple with an electronic system 260. The display 450 renders information provided by the electronic system 260, and replicates said information via the display 450. Some common forms of a display 450 are liquid crystal devices (LCD), light emitting diodes (LED), cathode-ray tube (CRT), and the like. The display 450 may be configurable to be provided as a touchable device. Thus, when a user touches the display 450, a command associated with an application or operation is asserted.

The application interfacer 411 receives information of an application presently being executed on electronic system 260, and displayed via display 450. The application data 411 may include a relative location associated with engage-able commands (or a graphical user interfaces, known as "GUI"). The GUI elements may be associated with a specific command, and once engaged, instigates the application being executed to perform a certain action.

The button interfacer 420 is configured to interface with the morphing pad 250 and receive a relative layout of associated buttons 300. The amount of buttons 300 may be cross-referenced with the app data 411. This may occur in different manners and techniques.

In one technique, the buttons 300 may each be assigned a specific area associated with display 450. For example, if the display 450 is composed of an X by Y amount of pixels, the X by Y amount of pixels may be demarcated, with a specific set of pixels being assigned to a specific button 300.

Once the buttons 300 are chosen, the morphing pad engager 430 is configured to communicate morphing pad data 431 to the morphing pad 250. The morphing pad 250, may then assert the buttons 300 chosen so as to project them in a manner that is closer to a user of the morphing pad 250.

Figure 5B:
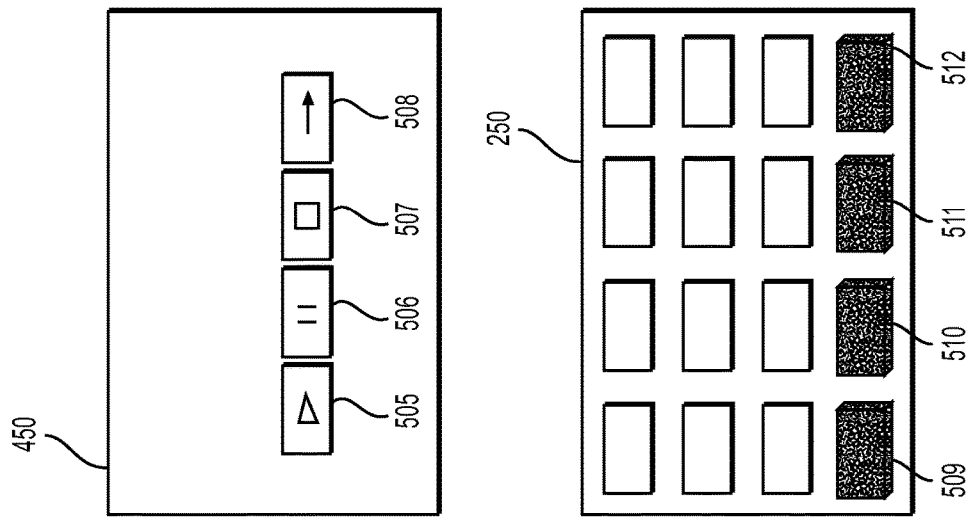
FIGS. 5(*a*) and (*b*) illustrate an example of an implementation of the system in FIG. 4.
Figure 5A:
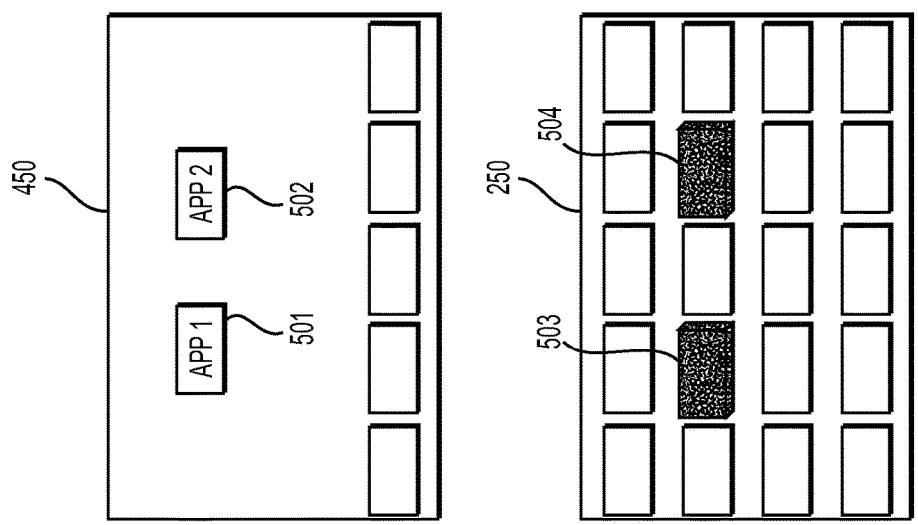

FIGS. 5(a) and (b) illustrate an example of an implementation of the system in FIG. 4. Referring to FIG. 5(a), display 450 shows an application and its corresponding screen.

There are a GUI elements 501 and 502 being displayed. As shown in the corresponding morphing pad 250, buttons 503 (coupled to GUI 501) and 504 (coupled to GUI 502) are asserted and made to be three-dimensional. Thus, a user associated with the setup in FIG. 5(a) may engage either of the buttons 503 or 504 to engage one of GUI 501 or 502.

Also of note with FIG. 5(a) is that the determination of the buttons 503 and 504 are made relative to the location of where GUIs 501 and 502 are presented via display 450. Since the GUIs are presented near the top of the display 450, the buttons being asserted on morphing pad 250 are also near the top.

Referring to FIG. 5(b), the display 450 is now showing another application (or another screen from the same application shown in FIG. 5(a)). As shown, there are GUIs 505, 506, 507, and 508, all near the bottom of the display 450. Employing the aspects above with regards to FIG. 4, the buttons being asserted (buttons 509, 510, 511, and 512) are all near the bottom of the morphing pad 250.

Figure 6:
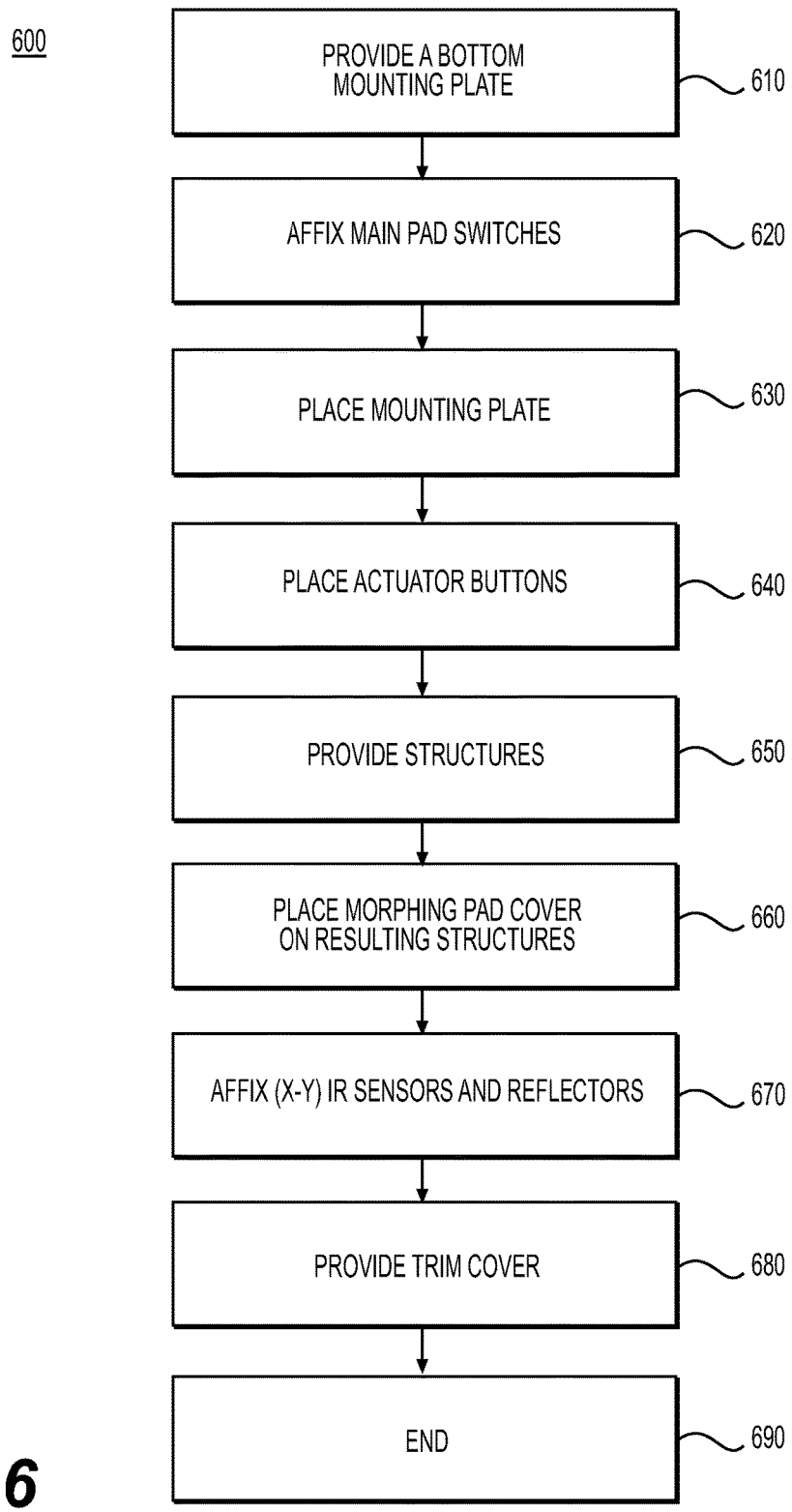
FIG. 6 illustrates an example of a method of manufacturing a morphing pad.

FIG. 6 illustrates an example of a method 600 of manufacturing a morphing pad 250. The resultant structure of the morphing pad 250 is shown in FIGS. 7(a)-(g), with each of FIGS. 7(a)-(g) corresponding to a specific operation shown in FIG. 6.

Figure 7B:
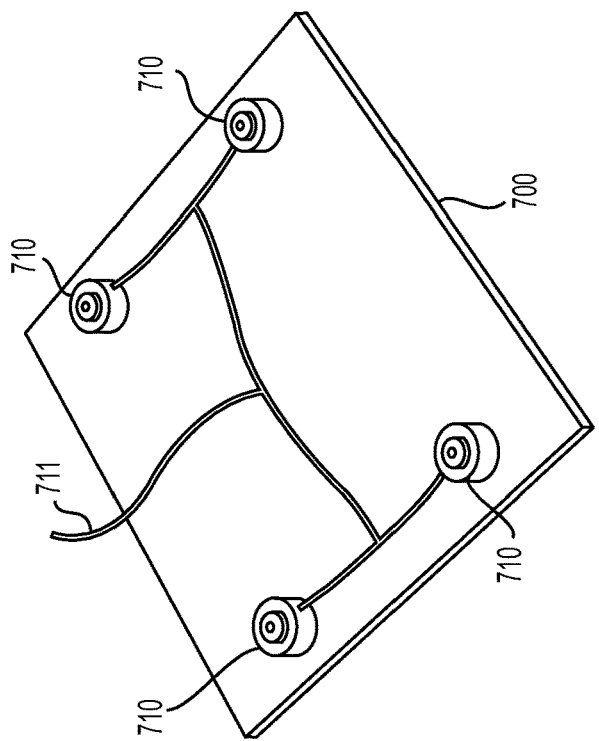
FIGS. 7(*a*)-(*g*) illustrate an example of a morphing touch pad according to the aspects disclosed herein.
Figure 7A:
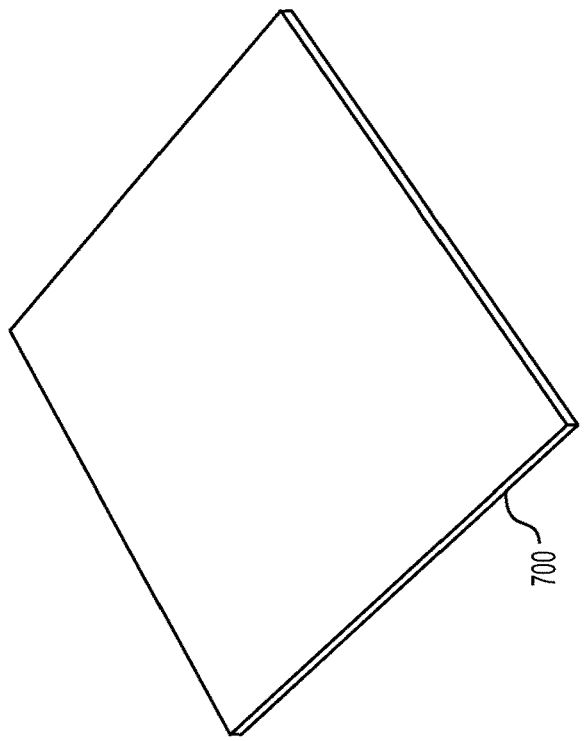

In operation 610, a bottom plate 700 is provided (as shown in FIG. 7(a)). In operation 620, main pad switches 710 are affixed to the bottom plate 700. The main pad switches 710 are connected to a device (not shown), via wires 711. In FIG. 7(b), four main pad switches 710 are shown; however, the number of main pad switches may be variable.

Figure 7D:
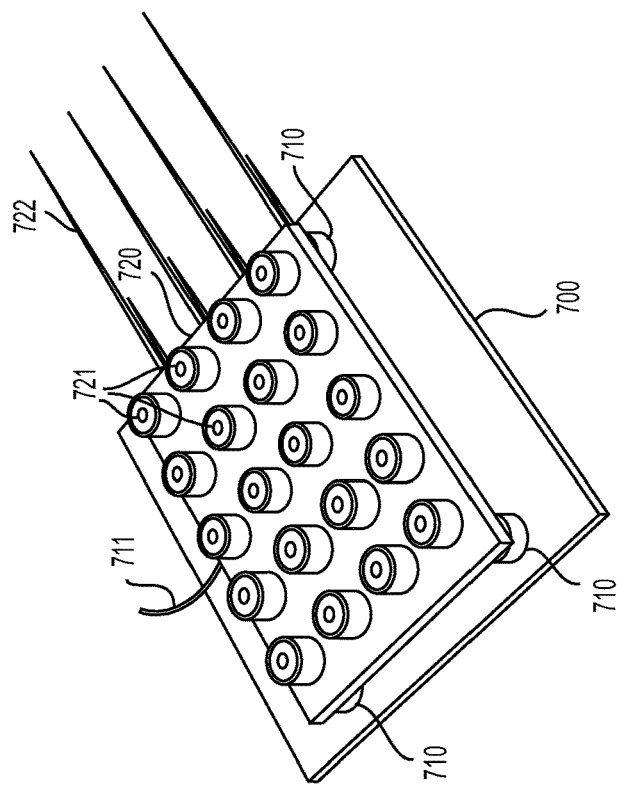
Figure 7C:
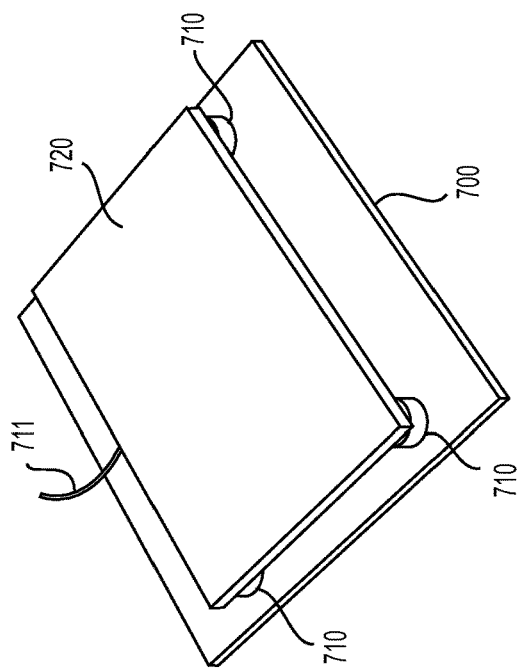

In operation 630, a second mounting plate 720 is provided on top of the main pad switches 710 (as shown, in FIG. 7(c)). In operation 640, moveable actuators 721 are placed on the second mounting plate 720. As shown in FIG. 7(d), the moveable actuators 721 are attached to the main pad switches 710 via wiring 722.

As shown in the example implementation, there are four main pad switches 710 provided. The four main paid switches 710, through various combinations may make 16 different combinations of commands. Each one of these combinations may be attached to one of the moveable actuators 721. Thus, when each of the moveable actuators 721 (shown) is engaged (i.e. pressed/engage from above), a corresponding signal is activated.

As explained above, the moveable actuators 721 move in a 'Z' direction. The 'X' and 'Y' direction represent the surface area of the bottom mounting plate 710 and the mounting plate 720. The 'Z' direction represents a direction indicative of movement towards the user who engages to the mounting pad 250. The moveable actuators 721 project forward based on control from an electronic system, such as system 200 and 400 described above.

Figure 7E:
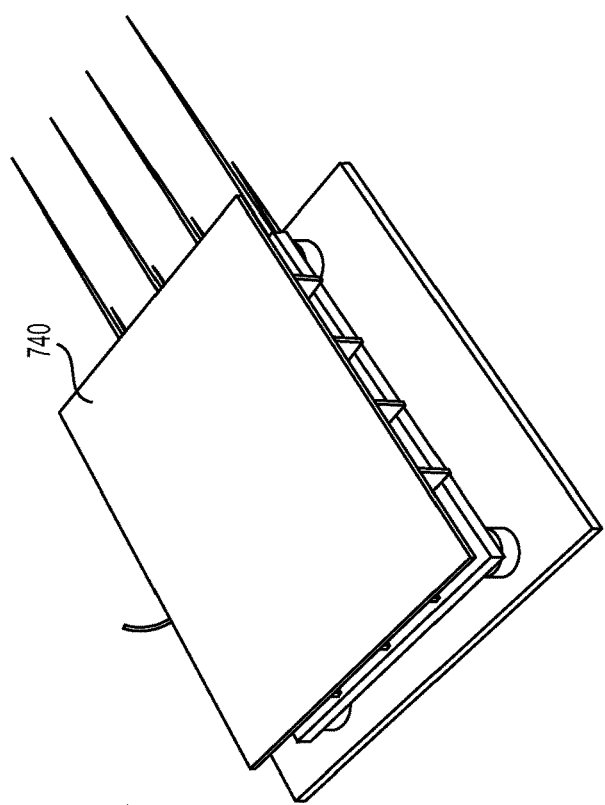

In operation 650, guide structures 730 are provided (as shown in FIG. 7(e)). These guide structures 730 are wall-like structures placed on the mounting plate 720. The guide structures 730 form a barrier between each of the moveable actuators 721.

Figure 7F:
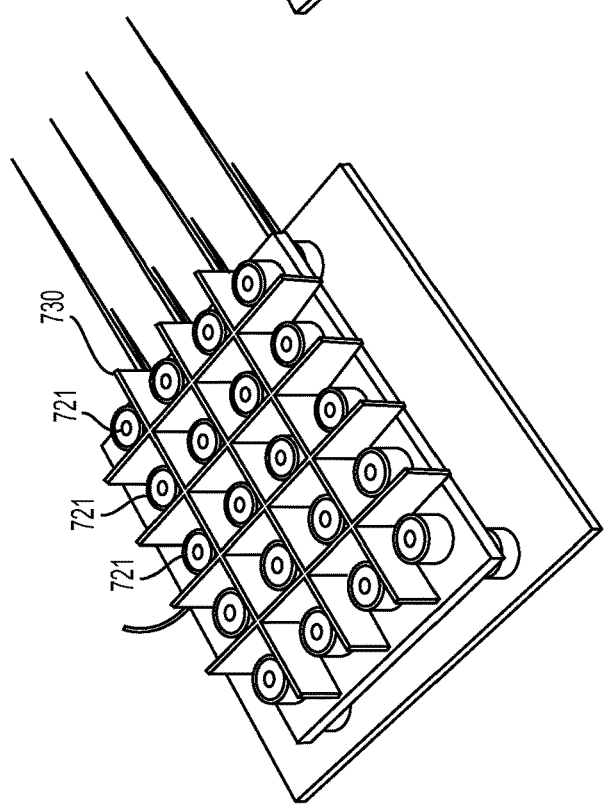

In operation 660, the morphing pad cover 740 is provided on top of the guide structures 730. As shown in FIG. 7(f), the morphing pad cover 740 is affixed on top of the structure. The morphing pad cover 740 may be a surface of an environment in which the morphing pad 250 is implemented in to serve as an interface. The morphing pad cover 740 may be in-molded to the various actuators 721. Thus, when the morphing pad cover 740 is situated, as shown in FIG. 7(g), the various indentations 750 may extend outwards (towards a user, and in the direction away from the mounting plates).

As discussed in FIG. 2, an optional embodiment is an implementation with IR sensors and reflectors. Thus, in operation 670, the IR sensor and reflectors may be installed to cover the portion on top of the morphing pad cover 740.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A system for implementing a morphing pad, comprising:
   a data store comprising a computer readable medium storing a program of instructions for the implementation of the morphing pad;
   a processor that executes the program of instructions;
   a detector configured to receive an indication of a user engagement with the morphing pad, wherein the user engagement is defined as a user situating an appendage in an area over the morphing pad prior to making physical contact with the morphing pad; and
   a morphing pad engager configured to engage a morphing pad based on the received indication, wherein the engagement of the morphing pad includes transitioning the morphing pad from a flat surface to a three-dimensional surface;
   a plurality of main pad switches affixed to a bottom mounting plate, the plurality of main pad switches including a defined number of main pad switches that cooperate to define a defined number of possible switch combinations;
   a plurality of moveable actuators electrically connected to the plurality of main pad switches and installed on a second mounting plate, the plurality of moveable actuators moveable in a projection direction away from the second mounting plate based on a respective electrical signal;
   wherein the plurality of moveable actuators includes a defined number of moveable actuators, with the defined number of main pad switches for controlling the plurality of moveable actuators is less than the defined number of moveable actuators;
   wherein the morphing pad engager is operable to provide a signal to the plurality of main pad switches to engage a respective one of the defined number of possible switch combinations to in turn actuate a respective one of the plurality of moveable actuators;
   a plurality of guide structures extending away from the second mounting plate in the projection direction to a plurality of distal ends to define a plurality of compartments each containing one of the plurality of moveable actuators;
   a cover extending over the plurality of distal ends of the plurality of guide structures, the cover being in-molded with the plurality of moveable actuators,
   wherein the detector includes a plurality of infrared (IR) transmitters disposed on a surface of the cover in which physical contact is made, and a plurality of IR sensors disposed on the surface,
   the plurality of IR transmitters and the plurality of IR sensors being disposed on a respective peripheral edge of the cover, and
   the plurality of IR transmitters and the plurality of IR sensors being disposed in directions perpendicular to each other.

2. The system according to claim 1, wherein each of the plurality of moveable actuators is configured to transition to a state of three-dimension in response to the detector detecting the appendage hovering over a respective one of the plurality of moveable actuators.

3. A morphing pad device comprising:
   a bottom mounting plate;
   a plurality of main pad switches affixed to the bottom mounting plate, the plurality of main pad switches including a defined number of main pad switches that cooperate to define a defined number of possible switch combinations;
   a second mounting plate disposed on top of the plurality of main pad switches;
   a plurality of moveable actuators electrically connected to the plurality of main pad switches and disposed on an opposing side of the second mounting plate relative to the plurality of main pad switches;
   wherein the plurality of moveable actuators includes a defined number of moveable actuators, with the defined number of main pad switches for controlling the plurality of moveable actuators is less than the defined number of moveable actuators;
   wherein each of the plurality of moveable actuators is moveable in a projection direction away from the second mounting plate based on an electrical signal from a specific one of the defined number of possible switch combinations; and wherein the plurality of main pad switches is electrically coupled to an electronic system, with the electronic system operable to selective provide a signal to selectively engage one of the defined number of possible switch combinations to move a respective one of the moveable actuators.

4. The morphing pad set forth in claim 3, wherein each of the plurality of main pad switches is completely disposed between the bottom mounting plate and the second mounting plate.

5. The morphing pad set forth in claim 3, further comprising a plurality of guide structures extending away from the second mounting plate in the projection direction to a plurality of distal ends to define a plurality of compartments, with each of the plurality of compartments containing one of the plurality of moveable actuators.

6. The morphing pad set forth in claim 3, further comprising a cover disposed on top of the distal ends of the plurality of guide structures, such that each of the plurality of moveable actuators is completely disposed between the second mounting plate and the cover, with the plurality of guide structures supporting the cover to form a space between the cover and the second mounting plate.

7. The morphing pad device according to claim 6, wherein in a first state, the cover is flat, and in a second state, the cover includes a plurality of bulges corresponding to a subset of the plurality of moveable actuators being engaged.

8. The morphing pad according to claim 6, wherein the plurality of guide structures disposed in-between each of the plurality of moveable actuators is a vertical wall extending in between the cover and the second mounting plate.

9. The morphing pad set forth in claim 3, wherein the defined number of main pad switches is equal to four, and the defined number of possible switch combinations is equal to sixteen.

10. The morphing pad set forth in claim 3, wherein the plurality of main pad switches are electively controlled to provide one of the defined number of possible switch combinations to move a respective one of the plurality of moveable actuators, such that the defined number of main pad switches required to control the moveable actuators is less than the defined number of movable actuators.

11. A morphing pad device comprising:
a bottom mounting plate;
a plurality of main pad switches affixed to the bottom mounting plate, the plurality of main pad switches including a defined number of main pad switches that cooperate to define a defined number of possible switch combinations;
a second mounting plate disposed on top of the plurality of main pad switches, such that each of the plurality of main pad switches is completely disposed between the bottom mounting plate and the second mounting plate;
a plurality of moveable actuators electrically connected to the plurality of main pad switches and disposed on an opposing side of the second mounting plate relative to the plurality of main pad switches;
wherein the plurality of moveable actuators includes a defined number of moveable actuators, with the defined number of main pad switches for controlling the plurality of moveable actuators is less than the defined number of moveable actuators;
wherein each of the plurality of moveable actuators is moveable in a projection direction away from the second mounting plate based on an electrical signal from a specific one of the defined number of possible switch combinations;
a plurality of guide structures extending away from the second mounting plate in the projection direction to a plurality of distal ends to define a plurality of compartments, with each of the plurality of compartments containing one of the plurality of moveable actuators;
a cover disposed on top of the distal ends of the plurality of guide structures, such that each of the plurality of moveable actuators is completely disposed between the second mounting plate and the cover, with the plurality of guide structures supporting the cover to form a space between the cover and the second mounting plate; and
wherein the plurality of main pad switches is electrically coupled to an electronic system, with the electronic system operable to selective provide a signal to selectively engage one the plurality of main pad switches in one of the defined number of possible switch combinations to move a respective one of the moveable actuators.

12. The morphing pad device set forth in claim 11, wherein the defined number of main pad switches is equal to four, and the defined number of possible switch combinations is equal to sixteen.

13. The morphing pad device set forth in claim 3, wherein the plurality of main pad switches are electively controlled to provide one of the defined number of possible switch combinations to move a respective one of the plurality of moveable actuators, such that the defined number of main pad switches required to control the moveable actuators is less than the defined number of movable actuators.

14. The system set forth in claim 1, wherein the plurality of main pad switches are electively controlled to provide one of the defined number of possible switch combinations to move a respective one of the plurality of moveable actuators, such that the defined number of main pad switches required to control the moveable actuators is less than the defined number of movable actuators.

* * * * *